US005586268A

United States Patent [19]
Chen et al.

[11] Patent Number: 5,586,268
[45] Date of Patent: Dec. 17, 1996

[54] MULTIPLE PERIPHERAL ADAPTER DEVICE DRIVER ARCHITECTURE

[75] Inventors: Karl C. Chen; Yu-Ping Cheng, both of San Jose, Calif.

[73] Assignee: Advanced System Products, Inc., San Jose, Calif.

[21] Appl. No.: 398,302

[22] Filed: Mar. 3, 1995

[51] Int. Cl.[6] .............................. G06F 13/24; G06F 13/36

[52] U.S. Cl. .......................... 395/250; 395/735; 395/280; 395/836

[58] Field of Search .................................... 395/882, 650, 395/884, 828, 500, 309, 800, 250, 735, 280, 836; 364/DIG. 1, DIG. 2

[56] References Cited

U.S. PATENT DOCUMENTS

| | | | |
|---|---|---|---|
| 4,589,063 | 5/1986 | Shah et al. | 395/828 |
| 4,701,848 | 10/1987 | Clyde | 395/650 |
| 5,060,149 | 10/1991 | Flurry et al. | 395/500 |
| 5,179,666 | 1/1993 | Rimmer et al. | 395/882 |
| 5,485,455 | 1/1986 | Dobbins et al. | 370/60 |

*Primary Examiner*—Daniel H. Pan
*Attorney, Agent, or Firm*—Fliesler, Dubb, Meyer & Lovejoy

[57] ABSTRACT

A single instance of a device driver is used to control multiple peripheral devices in a computer system having a central processor for executing an operating system, a memory, and first and second interface buses permitting interconnection of peripheral adapters with the central processor. The interface buses each correspond to different classes of peripheral adapters. The device driver includes an initialization routine for scanning the interface buses to identify predetermined functionally related peripheral adapters. A communications path is provided between the operating system and each of the peripheral adapters of a form appropriate for the particular interface bus connected to each adapter. A control path is also provided between each of the peripheral adapters and the operating system of a form appropriate for the particular interface bus connected to each adapter. The device driver provides for the common control and management of the communications and control paths between the operating system and each of the peripheral adapters.

7 Claims, 10 Drawing Sheets

MULTIPLE PERIPHERAL ADAPTER DEVICE DRIVER ARCHITECTURE

CROSS REFERENCE TO RELATED APPLICATIONS

The present application is related to the following applications, assigned to the Assignee of the present application:

1. Integrated Multi-Threaded Host Adapter, invented by Cheng et al., application Ser. No. 08/111,192, filed Aug. 27, 1993.

2. Method and Apparatus for Resolving I/O Port Address Conflicts, invented by Shih-Tsung Hwang, application Ser. No. 08/111,191, filed Aug. 27, 1993.

BACKGROUND OF THE INVENTION

1. Field of the Invention

The present invention is generally related to interface systems that provide for the logical integration of computer peripherals into an operating system, and, in particular, to a single instantiation device driver architecture that enables the integration of multiple different, though related, peripherals or peripheral adapters into an operating system.

2. Description of the Related Art

As the computing performance of small computer systems, often referred to as personal computers, has increased, performance limiting aspects of the peripheral interface buses implemented in such systems has been identified as a significant impediment to the continuing overall performance gains that might otherwise be realized. These peripheral interface buses are typically utilized to permit custom configurations of most of the high-performance peripheral subsystems used in small computer systems. These subsystems include, most notably, video, SCSI, and network interface controllers.

As the inherent performance of the central processing units and these peripheral subsystems have increased, a number of peripheral systems buses have been proposed and adopted by the industry in general. Early buses include the industry standard architecture (ISA) and extended industry standard architecture (EISA) buses. More recent introductions have included the video local bus (VL-bus) and peripheral component interconnect (PCI) bus.

While the design of each of these buses are to some extent related, as a practical matter their differences generally require that each bus be treated differently with regard to the peripheral devices that are attached to each of the different types of buses. In general, the configuration of peripheral subsystems on each of these bus types involves establishment of I/O addresses, a dedicated memory space, and unique or shared interrupts as necessary to support integration of the peripheral subsystem into the computer system as a whole. The practical differences, however, exist in the precise manner that these parameters are established with regard to each type of bus. As the bus specific parameter are typically, if not exclusively, managed by a device driver loaded as part of the active operating system of the computer system, conventionally individual device drivers have been provided for each peripheral interface card and, therefore, for each bus type. Thus, each device driver is specifically tailored for the support of a single physical adapter operating from a singular bus type.

Conventionally, the single driver per adapter relation has been seen as an advantage, allowing for the unique one-for-one tailoring of operating system level device drivers and hardware computer peripheral adapters.

With the advent of more complex computer systems incorporating not only current but legacy bus types within a single computer system, the utilization of specifically tailored device drivers serving a single adapter of a specific bus type has become disadvantageous. The particular disadvantages include a substantial increase in the complexity of managing and associating device drivers for peripheral adapters particularly when there can be multiple legacy bus types concurrently existing within the computer system. The end user is conventionally required select and associate particular device drivers with specific peripheral adapters, even if several of the adapters preform a related function and are from a single manufacture.

Furthermore, the manufacturer of the adapters must not only prepare different device drivers for each adapter and bus type combination, but must test the set of device drivers for all combinations of device driver loading circumstances to insure mutual inter-operative compatibility. The disadvantages of increased manufacturing and support cost consequently form a significant portion of the cost of adapter products today.

Another substantial disadvantage is that excessive computer system resources may be required to support multiple adapter products particularly where they only differ in bus type. The value of a legacy adapters is often preserved by maintaining the operational presence of the adapter in a computer system in secondary support of newer, high-performance adapters operating potentially from a different bus type. The duplication of required resources, particularly of memory space allocated by each device driver for internal use in performing required device driver functions, directly impacts the memory resources remaining available for application programs executing under control of the operating system. As such, the overall functionality of the computer system may be directly impaired as a consequence of retaining the operational functionality of legacy peripheral adapters. Indeed, the same problem potentially occurs whenever multiple peripheral adapters of a common function and bus type are utilized in a single computer system. Since conventionally, device drivers form a one-to-one correspondence with peripheral adapters, the inherent result is the excessive use of main memory resources in support of multiple adapters.

Consequently, a need exists to better facilitate the use and support of multiple peripheral adapters in a personal computer system while further optimizing the ability of the operating system to support application programs and the software configuration of device drivers within the computer system by the adapter manufacturer.

SUMMARY OF THE INVENTION

Thus, a general purpose of the present invention is to provide for the efficient handling of potentially multiple peripheral interface adapters through a single instantiation of a device driver in an operating system.

This is achieved in the present invention by providing a single instance of a device driver to control multiple peripheral devices in a computer system having a central processor for executing an operating system, a memory, and first and second interface buses permitting interconnection of peripheral adapters with the central processor. The interface buses each correspond to different classes of peripheral adapters. The device driver includes an initialization routine for scanning the interface buses to identify predetermined functionally related peripheral adapters. A communications path is provided between the operating system and each of the peripheral adapters of a form appropriate for the particular interface bus connected to each adapter. A control path is also provided between each of the peripheral adapters and the operating system of a form appropriate for the particular interface bus connected to each adapter. The core device driver provides for the common control and management of the communications and control paths between the operating system and each of the peripheral adapters.

An advantage of the present invention is that a single device driver provides for the operating system interface to multiple different peripheral devices of a related type.

Another advantage of the present invention is that only a single device driver is required for a given operating system independent of the particular peripheral bus or buses that are implemented on a given hardware platform.

Still another advantage of the present invention is that multiple different identification schemes can be used to identify related, though different peripheral devices.

A further advantage of the present invention is that required computer system resources are minimized and optimally managed through a single instantiation of the device driver.

Yet another advantage of the present invention is that the operation of the invention is fully consistent with foundational or motherboard based control of current and legacy bus structures.

A still further advantage of the present invention is that operating system resources, otherwise required for management and control of multiple device drivers, is not required while still obtaining the benefits of use of multiple peripheral adapters.

Yet still another advantage of the present invention is that, by management of multiple peripheral adapters by a single instantiation of a device driver, conflicts between the requirements of multiple device drivers can be reduced or eliminated.

BRIEF DESCRIPTION OF THE DRAWINGS

These and other advantages and features of the present invention will become better understood upon consideration of the following detailed description of the invention when considered in connection of the accompanying drawings, in which like reference numerals designate like parts throughout the figures thereof, and wherein.

DETAILED DESCRIPTION OF THE INVENTION

Figure 1:
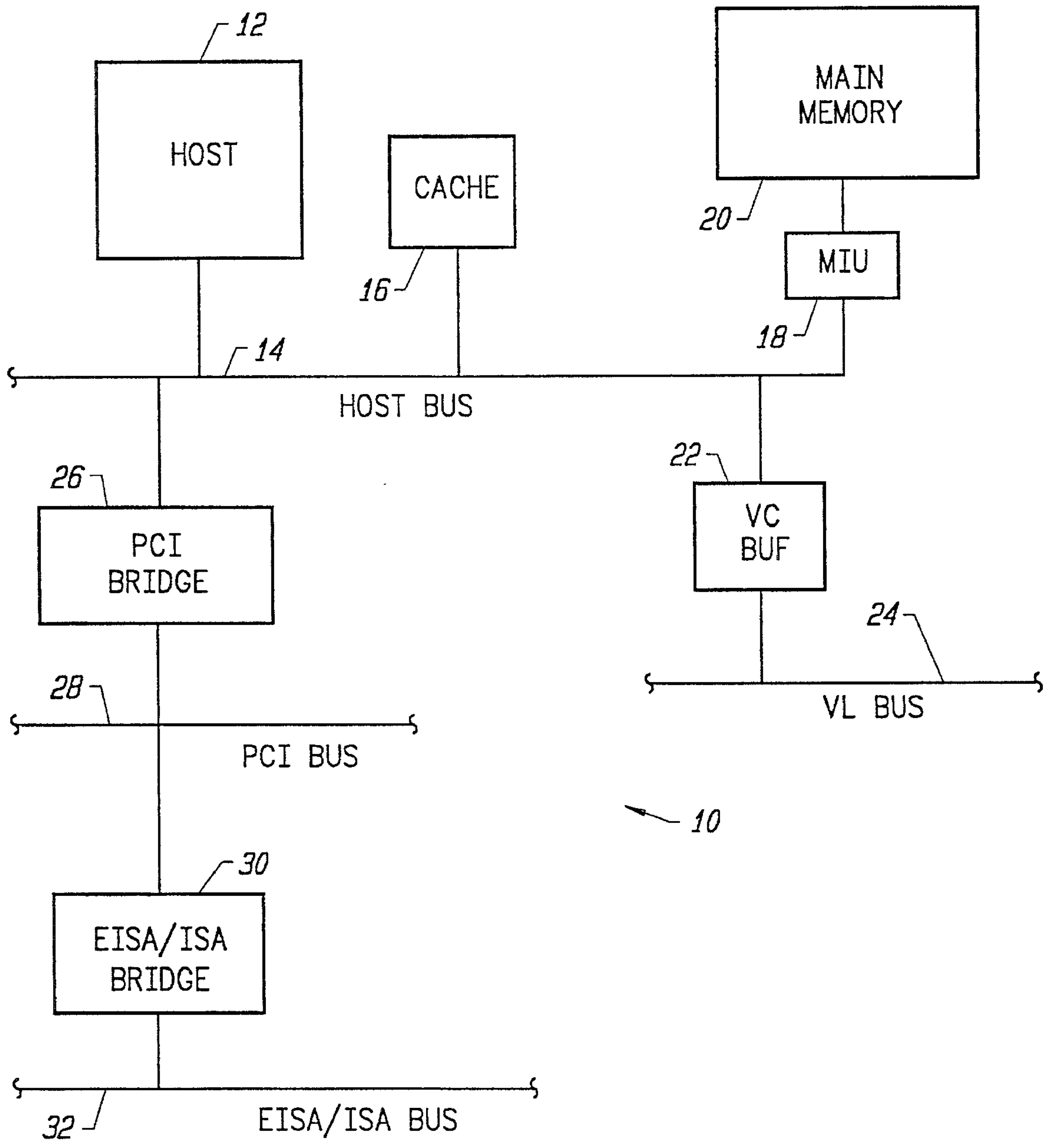
FIG. 1 is a simplified block diagram of a personal computer system consistent with the present invention.

FIG. 1 provides a block diagram of a conventional computer system that incorporates the currently four major bus types used in personal computer systems. The system 10 includes a host processor 12 connected via a synchronously operating host processor bus 14 to a second level cache memory 16, and through a memory interface unit 18 to a main memory array 20.

A video local bus buffer 22 couples the host processor bus 14 to a synchronously operating video local bus 24. The video local bus 24 has been standardized and is described in detail in the reports of the Video Electronics Standards Association published by the Video Local Bus Consortium, 2150 North First Street, Suite 440, San Jose, Calif. 95131-2029. As a consequence of the VL bus 24 being synchronously coupled to the host processor bus 14, the host processor and peripheral adapters that are electrically coupled to VL bus 24 share the same memory, I/O and interrupt space.

A PCI bridge circuit 26 is conventionally provided to couple a PCI bus 28 asynchronously to the host processor bus 14. The electrical definition of the PCI bus has been established as an industry standard as documented in the reports of the Peripheral Component Interconnect Special Interest Group as published by the Peripheral Component Interconnect Consortium, P.O. Box 14070, Portland, Oreg. 97293. The specification of the PCI bus functionally defines the implementation of the PCI bridge circuit 26. In effect, the PCI bridge circuit 26 provides a high-speed fifo based asynchronous interconnection between the PCI bus 28 and host processor bus 14. Consequently, the PCI bus can operate at a single fixed clock frequency with either a 32 bit straight-through or 64 bit wide multiplexed data path between PCI peripheral adapters and the host processor bus 14. The PCI bridge circuit 26 also permits mapping control over the memory, I/O and interrupt space of peripheral PCI adapters relative to that of the host processor 12. This mapping is programmable under control of the host processor 12.

An EISA/ISA bridge circuit 30 interface effectively couples the PCI bus 28 to an EISA/ISA bus 32. The ISA bus is documented in the IBM AT technical reference manual for IBM PC/AT type computer systems. The EISA bus is, in effect, an extension of the ISA bus to include a double width 32 bit-wide data path and the control ability to operate as a bus master device. The EISA bus has been standardized as documented in Extension to Industry Standard Architecture Report as established by the EISA User's Consortium, and available through BCPR Services, Washington, D.C.

Both EISA and ISA peripheral adapters share a memory, I/O, and interrupt space that conventionally corresponds to that of the host processor 12. However, in personal computer systems 10 that support the EISA/ISA bus as a legacy component slaved from the PCI bridge chip 26, as is typical of such systems, the resulting memory I/O and interrupt space is in effect mapped as a subspace of the PCI bus 28. However, for compatibility purposes, this subspace is remapped to the native space of the host processor 12.

Figure 2:
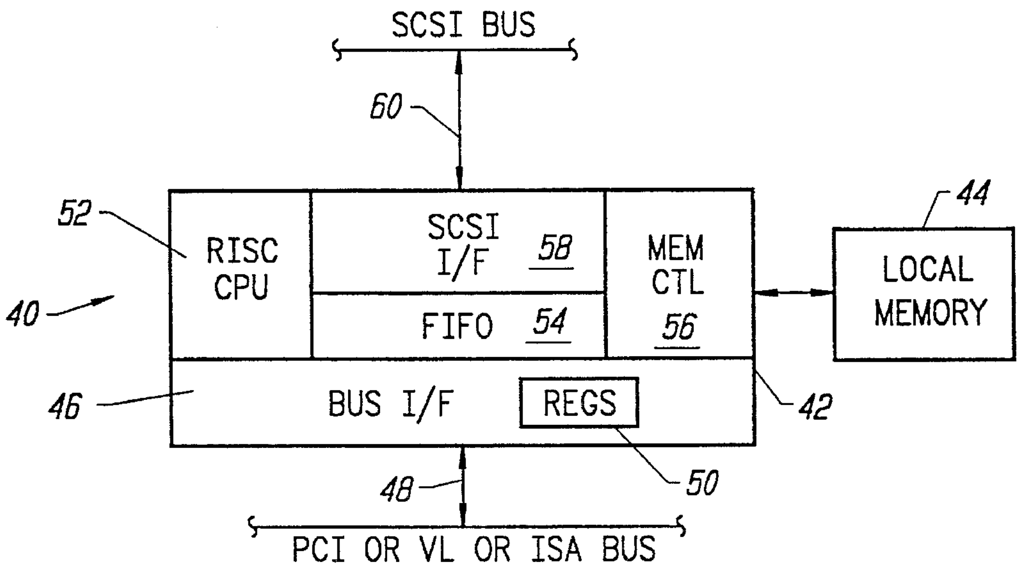
FIG. 2 is a simplified block diagram of a preferred PCI, VL, or ISA bus peripheral adapter for supporting SCSI bus based peripheral devices.

Referring now to FIG. 2, a generalized block diagram of peripheral adapter 40 essentially consistent with the construction of a PCI, VL, or ISA bus type peripheral adapter is shown. The principle components of the peripheral adapter 40 are a high-performance SCSI controller chip 42 and a local memory 44. The SCSI adapter chip 42 and specifically the internal construction and operation of the chip is described in detail in the prior filed application, "Integrated Multi-threaded Host Adapter" as identified above, which is hereby expressly incorporated herein. Within the adapter chip 42 a bus interface portion 46 is provided to establish an electrical connection via interface lines 48 to a PCI, VL or ISA bus, depending on the specific implementation of the chip 42. An I/O mapped register array 50 is effectively provided within the bus interface unit 46 so as to be accessible via the PCI, VL, or ISA bus. A RISC CPU 52 is provided to control the inter-operation of the bus interface unit 46 through a multipath bi-directional fifo unit 54 that establishes appropriate data paths between the bus interface unit 46, the local memory 44 under the control of a memory controller unit 56, a SCSI interface unit 58 and the RISC CPU 52.

The SCSI interface 58 provides for protocol handling appropriate for the management of target devices connected to an industry standard SCSI bus 60 electrically connected to the SCSI unit interface 58. The SCSI bus is documented in a document identified as X3T9.2 Project 375D which is available from Global Engineering, 15 Inverness Way East, Inglewood, Colo. 80112-5704.

In operation, the adapter chip 42 provides for the effective mapping of a port and the local memory 44 to within the I/O space of the processor 12 of the host computer system. The host computer system may then write SCSI transaction command descriptions into the local memory 44 where they may subsequently retrieved and processed by the RISC CPU 52. The local memory 44 is of sufficient size to permit a large number of SCSI transaction command descriptions to be stored concurrently, thereby precluding as a practical matter any delay in communication between the adapter 40 and host computer system. Each command description is sufficiently complete that RISC CPU 52 can complete the requested SCSI transaction with a specified target device without requiring any significant further processing intervention by the host computer system.

Preferably, the local memory 44 is divided into command description blocks having a predefined size and format so that the starting local address of the command description blocks are multiples of a fixed quantity. The command description blocks may be numbered, and the numbers, instead of longer local addresses, can be used as indices to identify the command description blocks. In, for example, standard SCSI-2 protocols, the block numbers can also be used as tag messages. Such tag messages allow the adapter 40 to quickly identify the command description block needed when an SCSI I/O request is resumed by a target device.

The command description blocks can be linked into lists, such as an active list containing the command description blocks that are ready for the processor to process and a free list containing command description blocks that are available for use by the host computer system. The RISC CPU 52 can monitor the free list for command description blocks written by the host computer system and then move the written blocks to the active list. Completed command description blocks can be moved from the active list to the end of the free list and can be used to pass the host computer system information concerning the completed command. The free and active list organization of data within the local memory 44 permits commands to be processed and completed in effectively random order.

Each command descriptor block (CDB) contains fields for information that describes an I/O request and fields used by the host processor 12 while an I/O request is active. Some of the fields in each CDB may contain:

1) Forward and backward pointers that link the CDBs into linked lists;

2) An SCSI device ID indicating a target SCSI peripheral device to which the request is directed;

3) SCSI command and length bytes indicating the operation and the number of bytes in a requested I/O;

4) A main memory address and length which indicate where data transfer is directed;

5) A pointer to an additional CDB for a scatter-gather address list used when data transfer is directed at several locations in main memory;

6) A main memory address for sense data if check status is returned;

7) Completion status bytes for indicating how much of the requested I/O is complete;

8) Status byte for indicating the status, EMPTY, READY, SG-LIST, ACTIVE, DISCONNECT, or DONE, of the CDB; and 9) Storage area used during a disconnect for data needed when an I/O request is resumed.

In order to manage the transfer of command information from the host computer system to the local memory 44, a device driver is installed as a component element of the resident operating system executing on the host computer system. The device driver implements the conventions necessary for communication between the operating system and the adapter chip 40. During start-up of the host computer system, the device driver is loaded into the main memory 20 of the computer system and incorporated into the executing operating system. The device driver includes an initialization routine for requiring the necessary system resources required by the device driver and to initialize the adapter chip 40 in local memory 44. Specifically, during adapter initialization, the device driver downloads micro-code for the RISC CPU 52 into a reserved portion of the local memory 44. The RISC CPU 52 is then enabled to execute this microprogram to complete any adapter chip 40 hardware initialization, including a self test, and ultimately begin monitoring and processing the established active and free command description block lists.

During ongoing operation, the device driver will write a SCSI transaction request into the current free command description block in the local memory 44 in response to an operating system request. This data is written through the register array 50 which serves to index a logical command description block visible to the device driver to an actual command description block on the free list in local memory 44.

The register array 50 preferably includes the following initial registers for enabling host processor access to the command description blocks.

Bank 0 Registers

Base addr + 0—Word, Read Only—Two bytes of ASPI ID to identify the chip.
Base addr + 1—Byte, Read Only—One byte of ASPI ID to identify chip.
Setup program finds the chip using ASPI ID before configuring the chip.

| | |
|---|---|
| Base addr + 2—Word, | Read/Write—Configuration |
| Bit 15–22 | BIOS address |
| Bit 11 | SCSI parity enable |
| Bit 10–8 | SCSI ID to be used by this chip |
| Bit 7 | VESA burst mode enable |
| Bit 6 | not used |
| Bit 5 | Host interrupt enable |
| Bit 4–2 | Host IRQ channel selection (not used by VESA) |
| Bit 1–0 | Host DMA channel selection (not used by VESA) |
| Base addr + 3—Byte, | Read only—Chip revision number |
| Base addr + 4—Word, | Read/Write—More Configuration stuff |
| Bit 15–14 | Local memory wait state selection |
| Bit 13–12 | not used |
| Bit 11 | 8 bit local memory data width |
| Bit 10–8 | I/O port address (high order three bits) |
| Bit 7 | not used |
| Bit 6 | Fast SCSI ACK signal |
| Bit 5–0 | I/O port address (low order five bits) |

The data contained in the above two registers are initialized form the EEPROM, if available, at power up. Changing bits 10–8 and 5–0 of base-addr + 4 changes the base I/O port address. To make the change effective, the change must be written to EEPROM and the power recycled.

| | |
|---|---|
| Base addr + 6—Word, | Read/Write—EEPROM Data |
| Base addr + 7—Byte, | Read only—EEPROM Command and Address |

These two registers are used to change the EEPROM contents and set up different configurations.

| | |
|---|---|
| Base addr + 8—Word, | Read/Write—Local RAM Data |
| Base addr + 10—word, | Read/Write—Local RAM Address |

To access the local memory 44, the host computer writes a local address to the Local RAM Address register and follows with repeated IOR or IOW instructions written to high bit of the word at Base addr + 10. These registers are used to load the RISC program and the CDBs into the chip local memory. They can also be used to read the RISC program local variables during abnormal condition recovery.

Once a command description block has been written to the local memory 44, as monitored by the RISC CPU 52, the command description block is logically detached from the free list by the RISC CPU 52 and added to the logical end of the active list. The indexed relationship between the virtual command description block and the next free list command description block is then updated. The incremental indexing of the logical command block is managed by the RISC CPU 52.

The RISC CPU 52 cycles through the command description block on the active list and initiates SCSI protocol requests for data transfer to identified target devices on the SCSI bus by way of the SCSI interface unit 58. When the target signals that the target is ready to begin the transfer of data, the RISC CPU 52 signals an interrupt through the bus interface unit 46 to the PCI, VL or ISA bus to cause the operating system to resume execution of a servicing device driver. When the device driver executes, the current active command description block may be read by the device driver from local memory 44 through the virtual command description block established by the register array 50. With the SCSI transaction thus identified, data may then be transferred between the host computer system and SCSI bus via the bus interface unit 46, fifos 54 and SCSI interface unit 58. Where multiple command description blocks correspond to a sequence that forms a larger SCSI transaction, the RISC CPU 52 may automatically increments the indexing of the virtual command description block in the register array 50. Thus, a lengthy SCSI transaction may be supported with minimum overhead to the host operating system.

Figure 3:
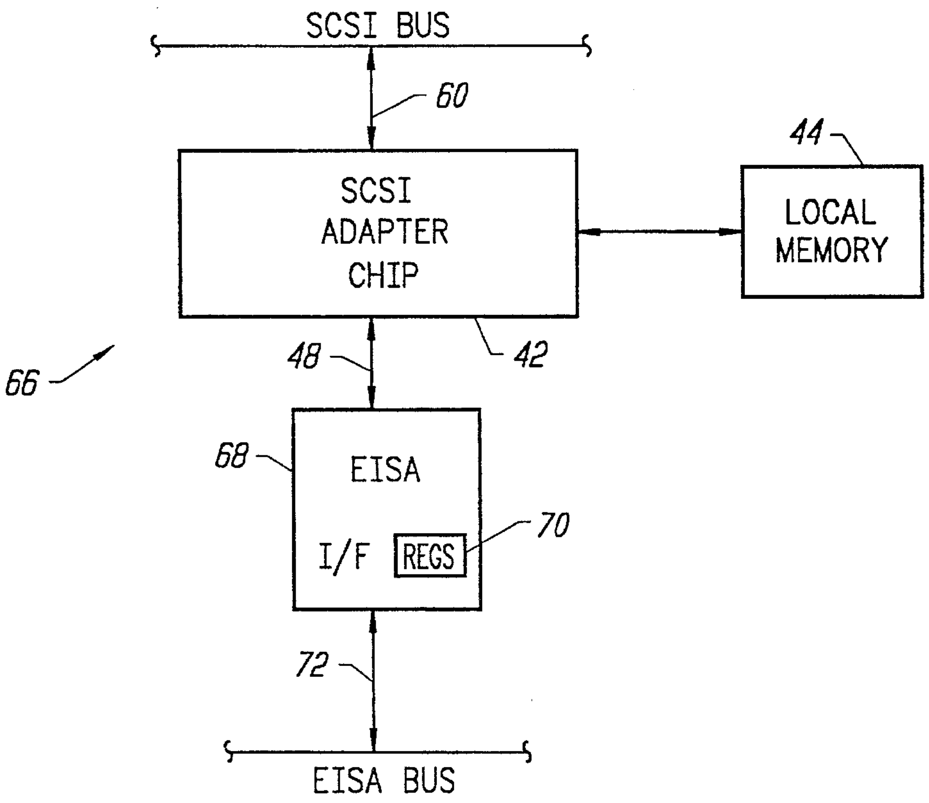
FIG. 3 is a simplified block diagram of an EISA bus type peripheral adapter suitable for supporting SCSI bus type peripheral devices.

A modified version of the adapter 40 is used to implement an adapter 66 suitable for use in connection with an EISA bus, as shown in FIG. 3. An SCSI adapter chip 42 and preferably a VL-bus specific implementation of the SCSI adapter chip 42 is interfaced to an EISA bridge interface circuit 68 via the bus lines 48. The EISA bridge interface circuit 68 operates substantially as a pass-through data and electronic interface adapter to an EISA bus 72. Additionally, a register array 70 is maintained within the EISA bridge interface circuit 68 so as to be accessible via the EISA bus 72 in accordance with the EISA adapter protocol standards. Specifically, the register array 70 includes a preprogrammed EISA adapter identification number that is conventionally used to logically identify the adapter 66. Otherwise, the EISA bridge interface circuit 68 permits the SCSI adapter chip 42 to operate relative to target SCSI devices coupled to the SCSI bus 60, the local memory 44, and the operating system and device driver substantially as described above in relation to FIG. 2.

Figure 4:
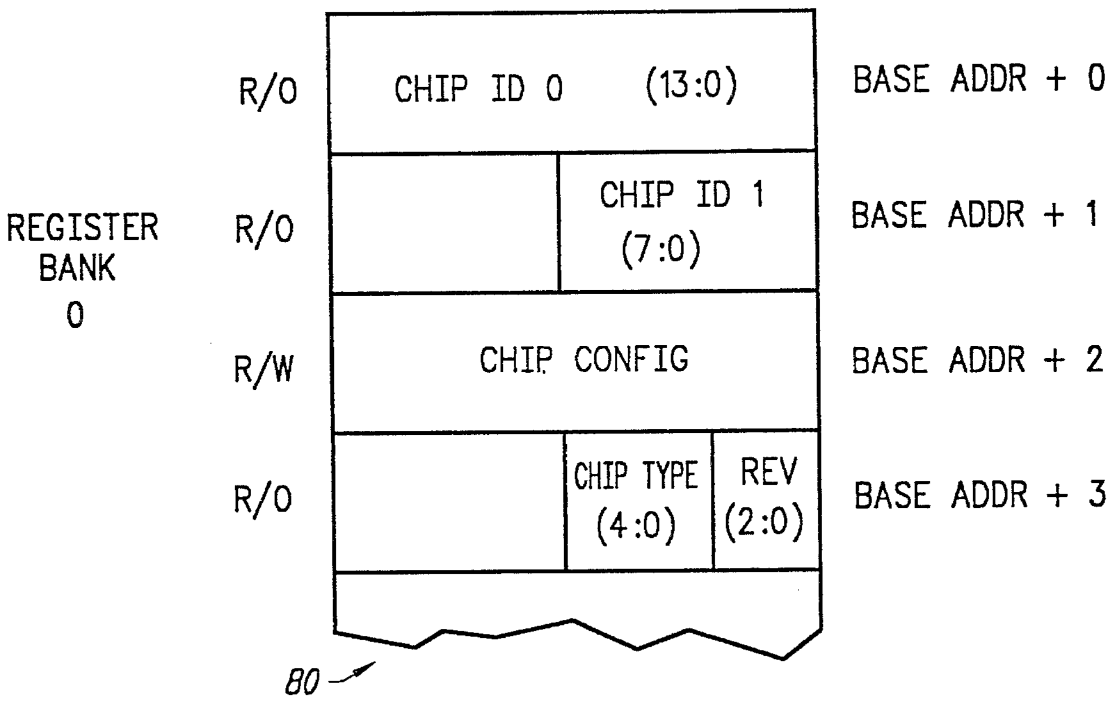
FIG. 4 is a logical schematic of a portion of the register space used in common in the preferred adapter chip implementation for use in conjunction with the present invention for ISA and VL bus type peripheral adapters.
Figure 5:
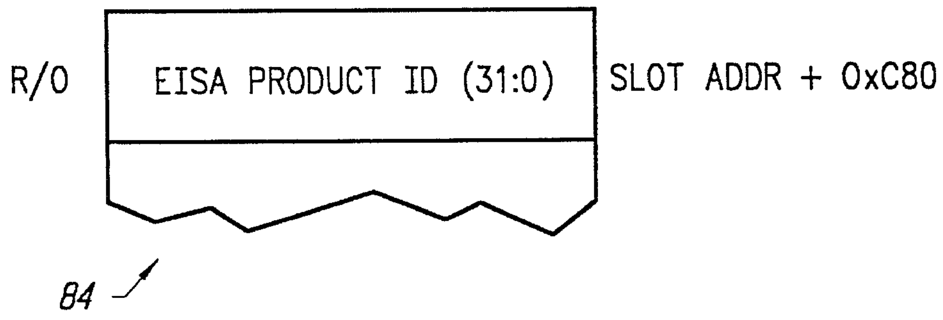
FIG. 5 is a simplified logical diagram of the register space utilized in the preferred EISA peripheral adapter to identify EISA bus type adapters in accordance with the present invention.

A portion of the register array 50 as implemented in VL and ISA bus variants of the SCSI adapter chip 42 is shown in FIG. 4. The register array portion 80 shown includes 4 word-wide registers located in the contiguous I/O space of the host processor 12 beginning at an adapter chip programmable base address. The manner of establishing the base address is described in the above-identified application "Method and Circuit for Resolving I/O Port Address Conflicts" which is hereby expressly incorporated by reference. The register at base address +0 is a read-only register pre-established with an 16-bit chip identification number. As will be described in greater detail below, this chip identification number is utilized to identify adapter chips of conformant design and peripheral function. In accordance with the present invention, an additional byte of chip identification information is located in the low-order byte at the register of base address +1. In the register at base address +3, the low-order byte includes a 5-bit chip-type identification number and a 3-bit chip-type revision number. Where the chip identification numbers at base address +0 and base address +1 are used to identify a conformant family of adapter chips, the chip-type field at base address +3 is utilized to identify a specific implementation. The chip-type revision field is used to identify the particular revision number of the identified chip-type. Presently, chip-types of PCI, VL and ISA have been established. The VL-type identified adapter chip is used in EISA adapter products. As shown in FIG. 5, a distinguishing EISA product ID is established by the EISA interface bridge chip 68 in the partial register array 84. This 32-bit identifier is located in the I/O space of the host processor 12 at an index of 0×C80 from a corresponding established EISA slot address. Consequently, the VL-type adapter chips can be readily distinguished between VL-bus and EISA bus adapter implementations simply based on the presence or absence of the EISA product ID.

Figure 6:
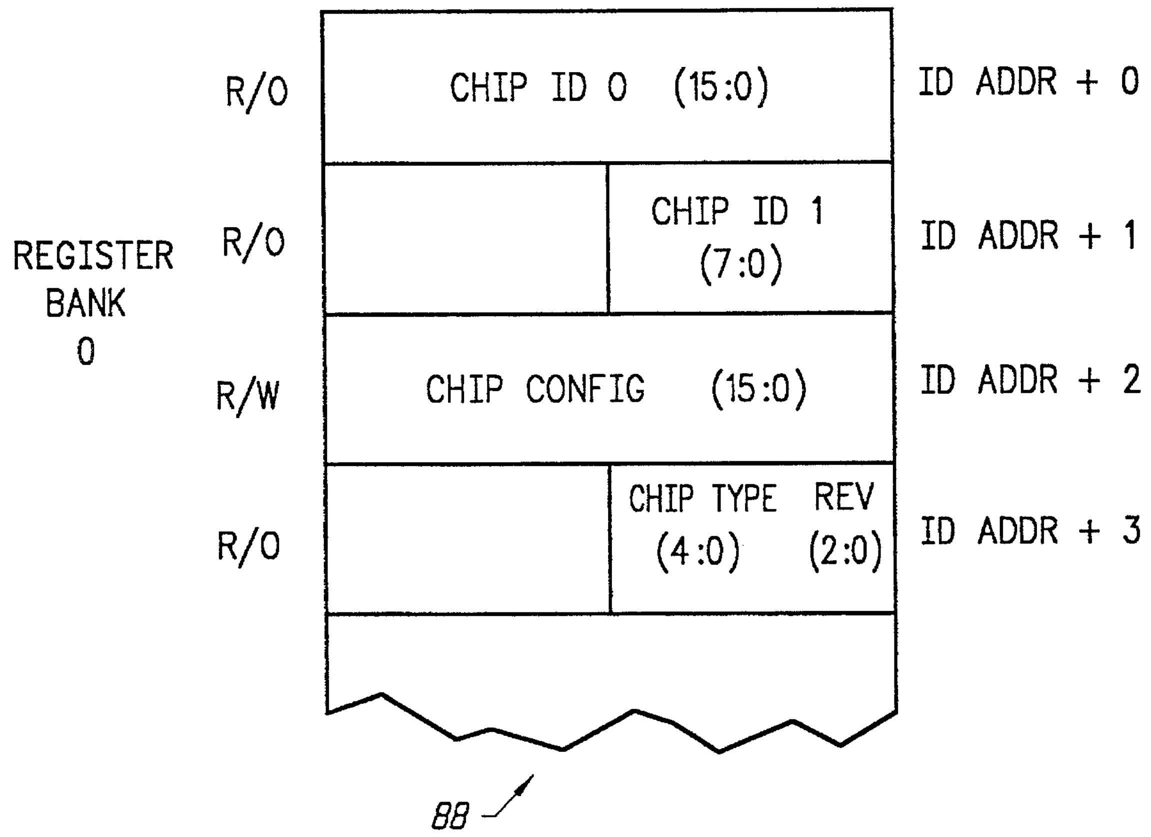
FIG. 6 is a simplified logical representation of the register space utilized in a PCI adapter chip in a preferred embodiment of the present invention.

As shown in FIG. 6, the partial register array 88 present in PCI specific adapters is substantially identical to the partial register array 80 as used in the VL and ISA adapter chips. The significant distinction rests in the particular value of the chip type field and the indexing of the register array 88 within the I/O space of the host processor 12. In accordance with the PCI bus specification, each PCI adapter is established as a separate ID address. Thus, the register array 88 is indexed from a PCI established ID address.

Figure 7:
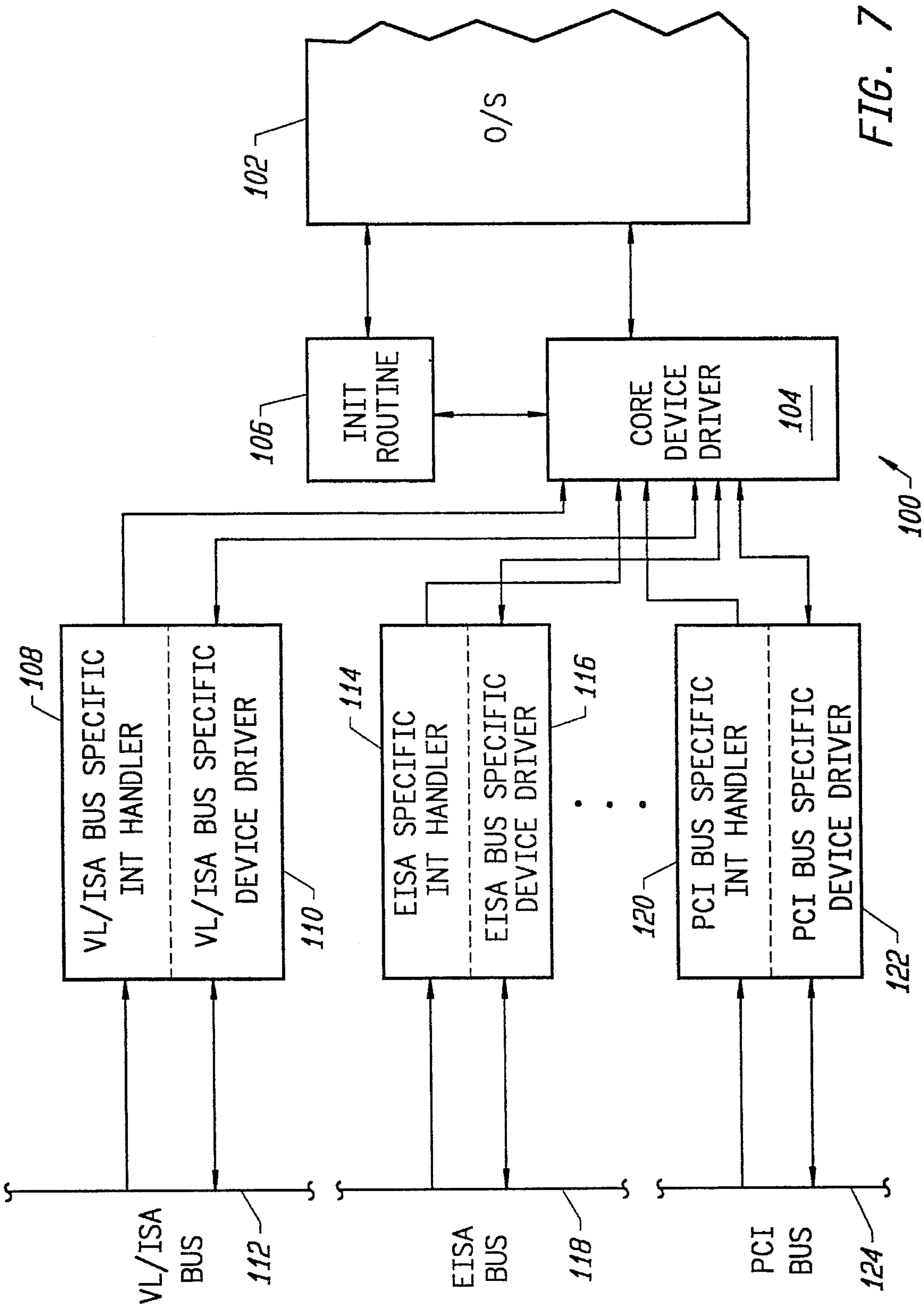
FIG. 7 is a block diagram of the software architecture of the multiple bus type managing device driver of the present invention.

Referring now to FIG. 7, a software block diagram of the multiple bus device driver 100 of the present invention is shown. The device driver 100 interfaces with the operating system 102 executed by the host processor 12, the device driver 100 includes a core device driver portion 104 and an adjunct initialization routine module 106. The interface between the core device driver and operating system 102 is typically defined by the operating system itself. The interface definition typically provides for entry points to the core device driver 104 to pass peripheral requests and to read and write peripheral data. An entry point that allows the operating system to inquire as to the status of the device driver is also typically provided. Finally, an initialization routine entry point is provided to permit the execution of the initialization routine 106 upon start-up of the operating system 102 and subsequent to the loading of the device driver 100.

As part of the execution of the initialization routine 106, the system resources required for proper operation of the core device driver 104 are established. The initialization routine 106 further directs the identification of all potentially present bus types within their personal computer system and directs the scanning of each four adapters types, in a preferred embodiment, that may be managed by operation of the core device driver 104. Where an adapter is identified, a bus type specific sub-device driver is logically incorporated with the core device driver 104 to establish a logical data path between the bus-type specific adapter and the core device driver 104. An interrupt handling routine, also corresponding to the bus-type, is logically incorporated as an interrupt service call back handler between the core device driver 104 and operating system 102. The initialization routine 106 also provides for the initialization of the adapter hardware and download of adapter micro-code.

Ultimately, an identification of all of the physically present and operating target devices connected to any of the identified conforming adapters are collected and returned by the initialization routine 106 to the operating system 102. The returned information not only specifies the individual target devices but further logically associates those devices with the specific adapter managed by the core device driver 104. Consequently, subsequent requests initiated by the operating system 102 relative to a particular target device can be appropriately identified and directed to and through the core device driver 104 to the proper adapter chip. As shown in FIG. 7, the VL/ISA, EISA and PCI bus specific interrupt handlers 108, 114, 120 and device drivers 110, 116, 122 are logically coupled between the core device driver 104 and the VL/ISA, EISA and PCI buses 112, 118, 124.

Each of the bus specific interrupt handling routines 108, 114, 120 represent small portion of code that perform the generally minimum function necessary to determine whether a signaled interrupt needs to be serviced based on information as provided by the operation system 102. Where an interrupt is to be serviced, the interrupt information is minimally generalized before being provided to the core device driver 104. The minimally generalized information is sufficient to identify the bus type associated with the interrupt, an identification of the interrupting target device, any relative priority information associated with the type of interrupting device. [Q: is this correct] In a similar manner, the bus type specific device driver modules 110, 116, 122 are in effect small subroutines encapsulating the hardware specific details required to enable data communications between the core device driver 104 and a respective bus type adapter. Consequently, the set of bus-type specific sub-device driver subroutines 110, 116, 122 is both small and highly optimized.

Consequently, the substantial portion of the device driver 110 in terms of code size and system resource requirements is within the core device driver 104. By utilizing a single core device driver 104 for servicing any number of adapters spread across any number of different specific bus types, maximum utilization is made of the device driver required resources. Furthermore, the system data resources required by the core device driver 104 can be managed uniformly for all adapters that are under management of the device driver 100. Consequently, there is a substantial efficiency in the utilization of system resources by the device driver 100. Furthermore, by the common management of multiple adapters of potentially different bus types by a single device driver, conflicts between device drivers competing for or indeed even misusing system resources is reduced if not eliminated.

Figure 8:
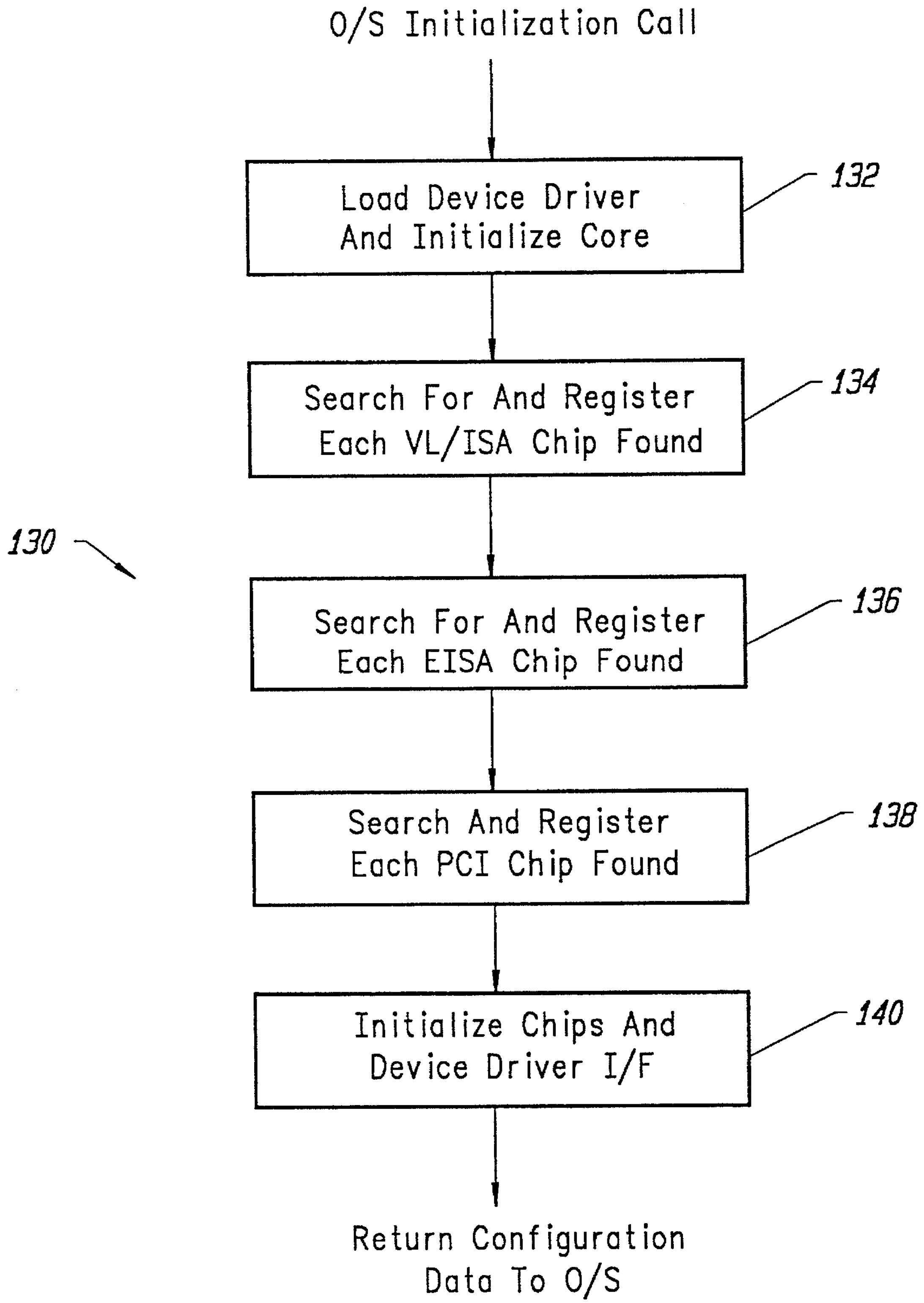
FIG. 8 is a flow diagram illustrating initialization of the device driver of the present invention.

Referring now to FIG. 8, the process 130 performed by the initialization routine 106 begins from an operating system initialization call. The device driver itself is loaded and basic system resources are acquired 132. A sequence of searches that are comprehensive to the likely different bus types present within a personal computer system is then initiated. In a preferred embodiment of the present invention, the initial search 134 is for the VL/ISA adapters that have an conformant adapter chip recognizable by the device driver 100. Subsequent searches are then performed for conformant EISA adapters and PCI adapters 136, 138 in a preferred embodiment of the present invention.

Once all conforming adapters have been identified, the initialization routine 106 proceeds to initialize each of the adapter chips and establish the bus type specific device driver interfaces for each of the bus types for which adapters were found 140. As a consequence of the initialization operation 140, the device driver 100 will have identified each of the target devices physically attached to each of the different conforming adapters found to exist within the personal computer system. This information is then passed from the initialization routine 130 to the operating system to enable each of the target devices to be logically identified by the operating system by way of the device driver 100. The initialization routine 130 then returns execution to the operating system.

Figure 9:
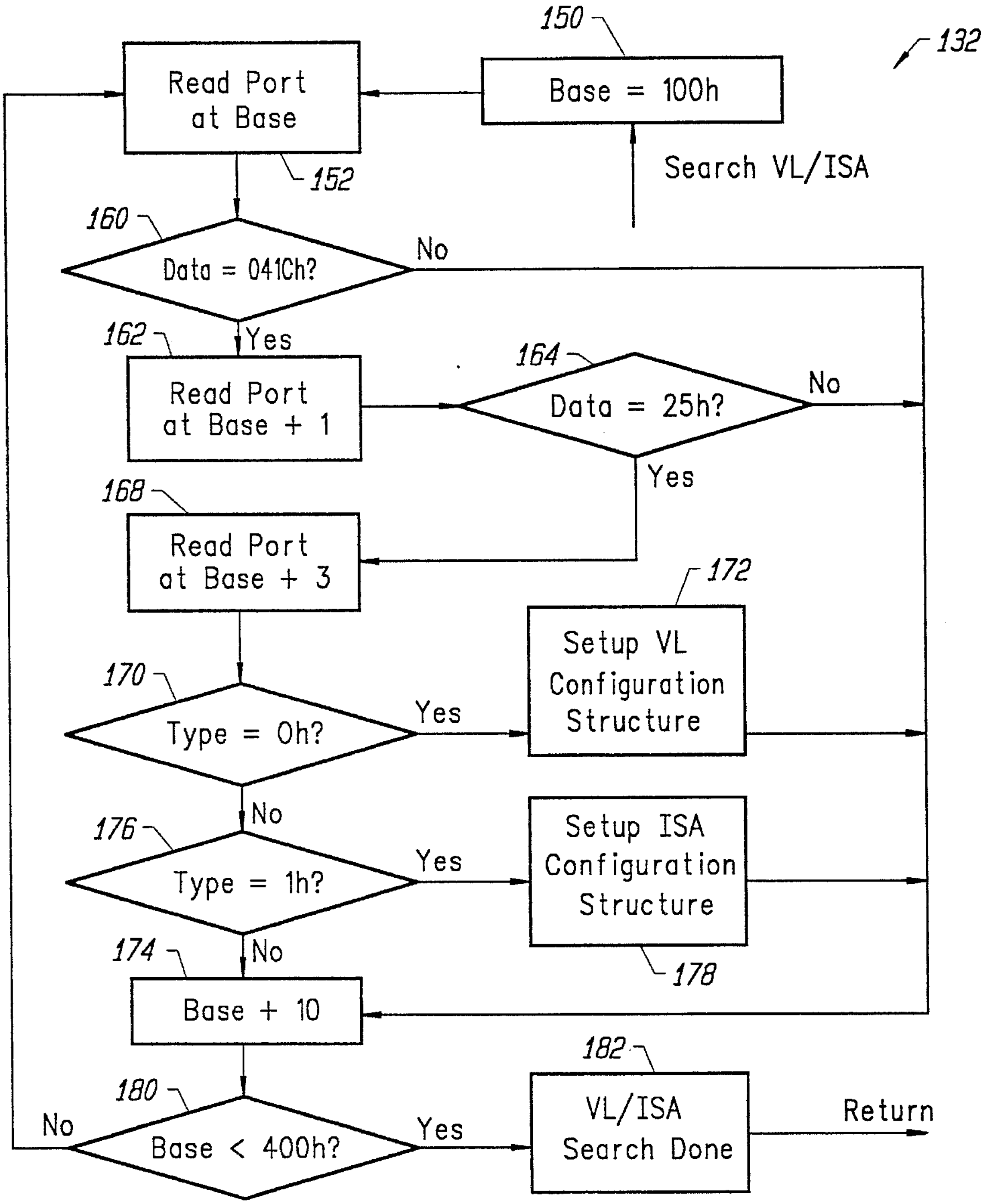
FIG. 9 is a flow diagram illustrating a logical operation of a ISA and VL bus based search for functionally identifiable peripheral adapters consistent with the present invention.
Figure 10:
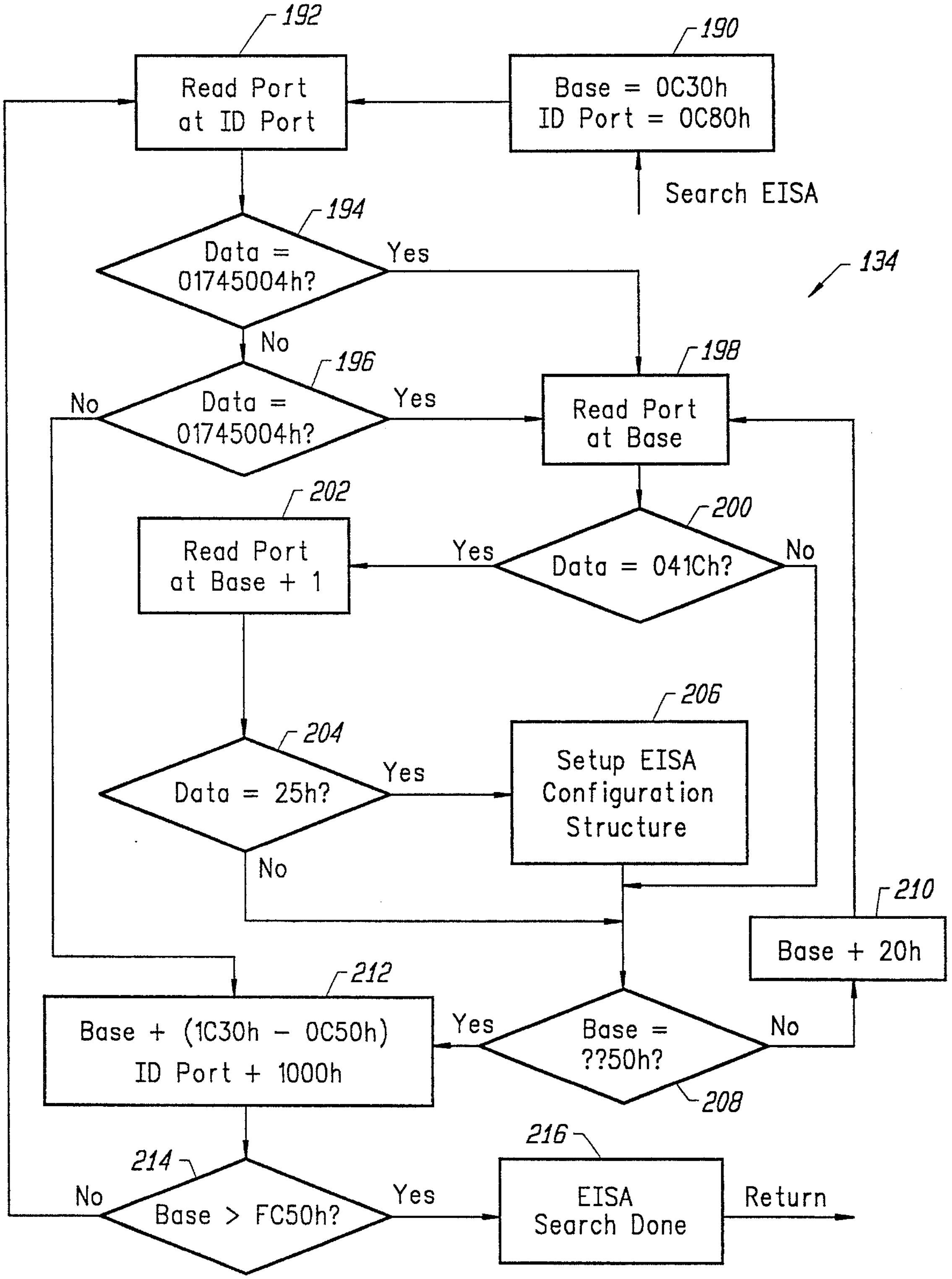
FIG. 10 is a software flow diagram illustrating the search for EISA peripheral adapters of a common functional description in accordance with the present invention.

Since both the VL bus and ISA adapters conformant to the present invention occupy the same memory, I/O, and interrupt space, a single search routine 132 is utilized to identify all VL and ISA conformant adapters, generally as indicated in FIG. 9. On initiation of the search 150, the I/O search space for conformant adapters is established at a base address of 100 h. The contents of the I/O port at the base address is then read 152. If the port contents match 160 the data value 041Ch 160, the port address is incremented and a second port read is performed 162. If the low order byte read 164 matches 25 h, another I/O read 163 is performed at the base address +3. This port read is masked to identify the chip type field. If the resulting marked value is equal to "0," then a VL type adapter chip has been identified 170. A VL adapter configuration structure 172 is then established for subsequent use with the core device driver 104. This VL configuration structure includes an identification of the adapter chip based on the current I/O port base address and the type of the adapter chip found.

Alternatively, where the masked value is "1," an ISA bus type adapter chip has been identified 176. An ISA configuration structure is therefore prepared and associated with the core device driver 104. This configuration structure is essentially identical to that of the VL adapter configuration structure except that the adapter type field identifies an ISA adapter chip. Once a configuration structure has been prepared or if a conformant adapter has not been identified at the current base I/O address, the search continues with the incrementing 174 of the base address by a value of 10 h. Where the resulting base I/O port address is less than 400 h, execution continues by looping back to read the base port value 152. If, however, the base I/O address has reached 400 h, the VL/ISA bus type search has been completed 182 and execution continues with the initialization routine 130.

Preferably, the initialization routine continues with a search for EISA bus type adapters. The search is initialized by setting the I/O base address to 0C30h and the EISA product ID port equal to 0C80h. The product ID port is then read 192 and the resulting value compared 194, 196 to the two possible preassigned product IDs associated with adapter chips of the present invention. If either product ID is found, the port value at the base I/O address is read 198 and compared to the value 041Ch. If the comparison 200 is true, then the I/O port at base +1 is read 202 and the resulting low order byte value 204 compared to 25 h. If the comparison is true, a conformant adapter chip has been identified. Since, in accordance with the present implementations of the invention, only a VL bus type adapter chip is utilized in an EISA adapter, any further discrimination of the adapter chip type is unnecessary. Of course, the particular revision of the adapter chip may be of interest and read at this point. An EISA configuration structure is then established in connection with the core device driver 104 to identify the particular EISA product ID port and I/O base address corresponding to the identified conformant adapter.

The termination condition of the first of two major loops is then examined 208. If the I/O base address is not equal to ??50 h, the base I/O address is incremented 210 by a value of 20 h and execution continues with reading the value at the base I/O port 198. In this manner, a search is performed within the I/O space allocated to a particular EISA product ID port.

When the ID port corresponding I/O space has been searched 208, the next ID port is selected and the I/O base address is reset 212. If all available ID ports have not been searched 214, execution continues by reading the ID port 192. After all ID ports have been searched, the core device driver 104 is provided with the set of EISA configuration structures identifying the identified conformant EISA adapters 216 present in computer system. Execution then resumes with the initialization routine 130.

Figure 11:
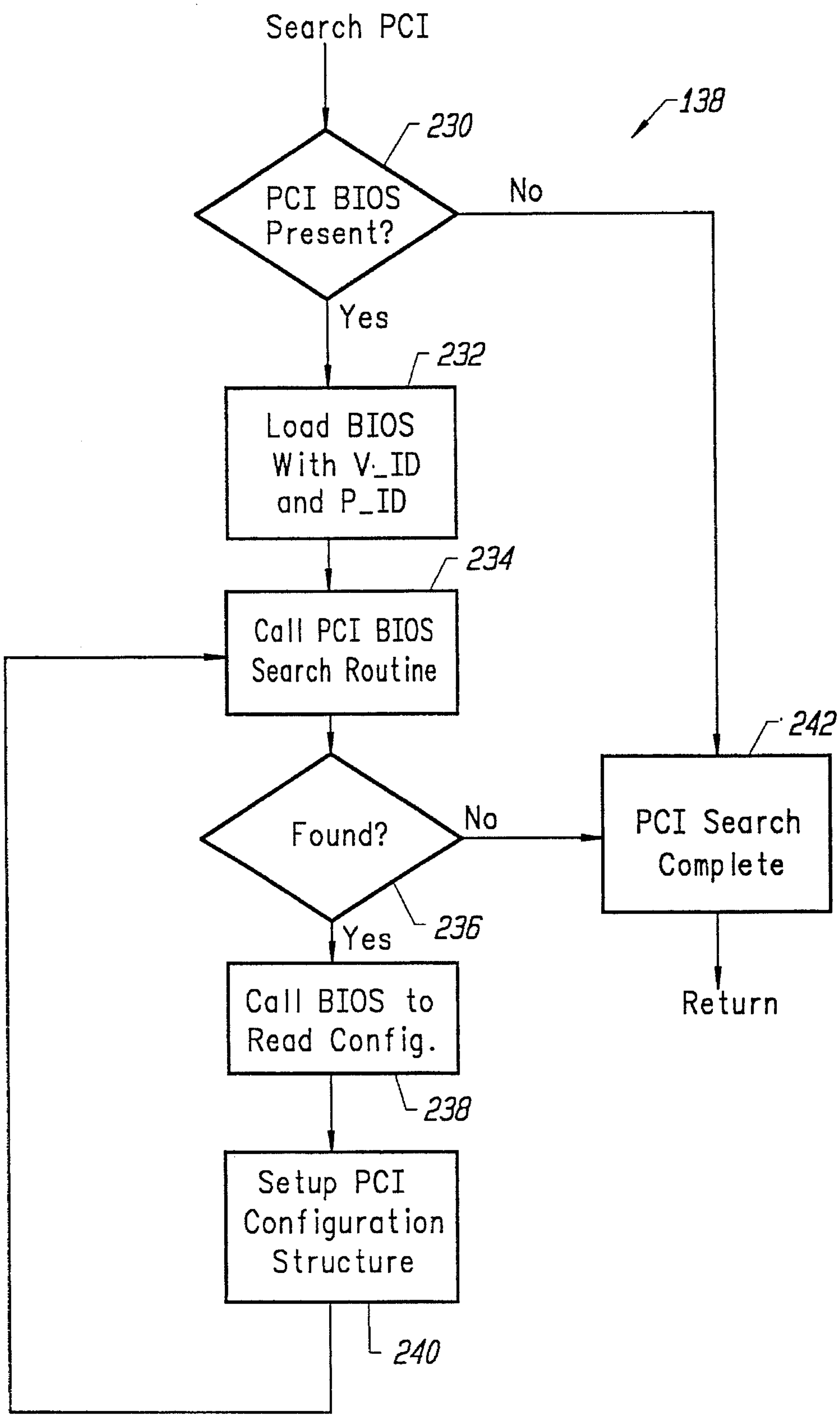
FIG. 11 is a software flow diagram illustrating the search for PCI bus type peripheral adapters of a common functional description in accordance with the present invention.

As shown in FIG. 11, the next search is for conformant PCI adapters 138. An inquiry type PCI BIOS call is made to the firmware BIOS of the personal computer system. The function and implementation of a PCI BIOS module is specified in the PCI specification. If a PCI BIOS module is present, the inquiry returns true. An unknown BIOS call error is returned if a PCI bias module is not present. Where a PCI BIOS is present, subsequent BIOS calls 232 are performed to supply the PCI BIOS with a vendor ID (10CDh) and a product ID (1100 h or 1200 h) that would specify a conformant PCI adapter. A PCI BIOS search start call is then made 234 to initiate the search routine. If the search routine identifies a conformant adapter 236, then subsequent PCI BIOS calls 238 are performed to read the configuration space associated with the adapter. The information contained within the configuration space is utilized to initialize a PCI configuration structure 240 that identifies the type and configuration parameters of the identified conformant adapter. The search routine is then continued with another call 234 to the PCI BIOS.

When the PCI BIOS search routine completes without identifying any additional conformant adapters, any PCI configuration structures prepared by the search routine 138 are provided 242 to the core device driver 104. The PCI search routine 138 then returns executing to the initialization routine 130.

Figure 12:
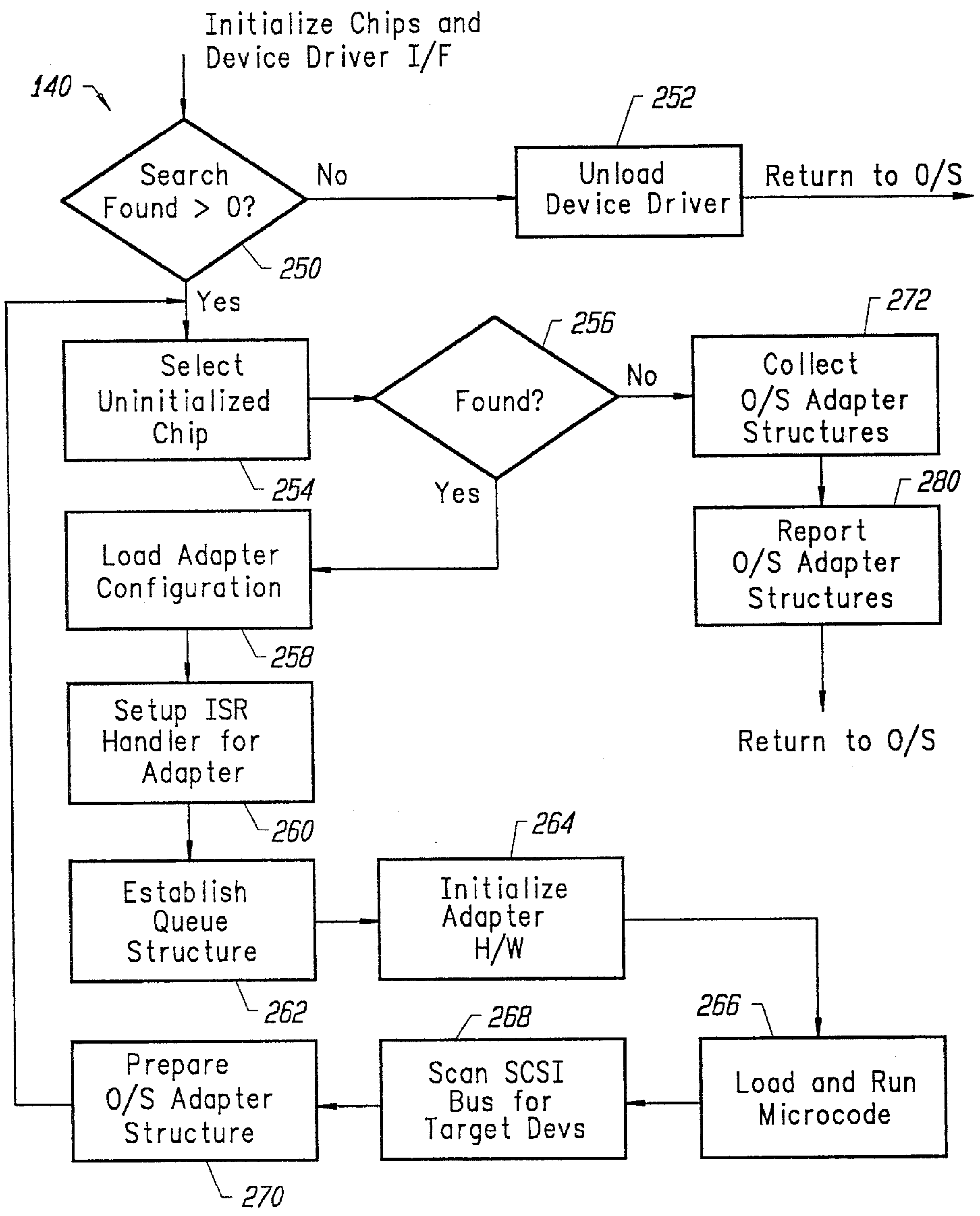
FIG. 12 is a software flow diagram illustrating the initialization of multiple common functionality peripheral adapters and the establishment of control for those adapters through a single device driver within the computer operating system.

Once all of the available bus types have been searched for conforming adapters, each of the adapter chips on the conforming adapters must be initialized and identified to the operating system as shown in FIG. 12. If no conforming adapters are found 250, then the device driver 100 is released form memory and execution returns to the operating system.

If conforming adapters are found 250, an adapter chip is selected for initialization 254, 256. The individual ISA, VL, EISA and PCI configuration structures are further prepared 258 for use by the core device driver 104 with the entry of certain adapter capabilities such as DMA performance limits, shared interrupts capability, and whether tagged queuing is permitted. Each of the configuration structures are provided with a unique identifier to permit proper processing of interrupt service routine calls from the operating system 260. That is, when the interrupt service routine that corresponds to any set of adapter chips that are sharing a common interrupt is made by the operating system, an identifier will be provided by the operating system at least inferentially to identify a particular configuration structure for which the presently pending interrupt must be evaluated. Next, the command description block queue structures are initialized 262 in the local memory associated with the adapter chip being initialized. The hardware registers of the adapter chip are then initialized 264, the microcode program is downloaded to the local memory of the adapter chip and execution of the microprogram is initiated 266.

At this point, the adapter is substantially initialized. However, the adapter chip still needs to be registered with the operating system. To prepare for registering, the device driver 100 directs a scan 268 of the SCSI bus attached to the adapter chip to get the capabilities of each SCSI device logically connected to the adapter chip. This information is included in the adapter structure of the chip currently being initialized 270. Execution then continues with the selection of the next uninitialized chip 254.

Once all conformant adapter chips have been initialized 256, all of the adapter structures are verified 272 and sequentially registered to the operating system 280. Consequently, each conformant chip, consistent with the present invention, is indirectly reported to the operating system by the representative existence and reporting of the adapter structures.

Thus, a single instantiation of the device driver 100 efficiently provides for the comprehensive management of multiple conformant peripheral adapters while effectively managing all details of the distinctions between the adapters specifically including operation with respect to different bus types. In the simplest configuration, the single device driver of the present invention universally identifies and manages a conformant peripheral adapter without requiring a correspondence between a particular bus type and the implementation of the device driver at least at a user level, In more complex configurations, the single instantiation of the device driver of the present invention comprehensively provides for the identification of multiple conformant peripheral adapters independent of the number of specific bus types, thereby permitting highly efficient cooperative operation between each of the peripheral adapters so managed.

Based on the description of the present invention as set forth above, many modifications and variations may naturally be made. It is therefore to be understood that, within the scope of the claims, the invention may be practiced otherwise than as specifically described herein.

We claim:

1. A device driver system for controlling access to multiple peripheral devices in a computer system having a central processor for executing an operating system as stored in a memory and coupled to said central processor, and first and second peripheral interfaces providing for the interconnection of first and second peripheral devices with said central processor, said first and second peripheral interfaces corresponding to first and second predetermined different classes of peripheral devices, said device driver system comprising:

a) means for scanning said first and second peripheral interfaces to identify peripheral devices of a predetermined type;

b) first means for establishing a communications path between said operating system and each of said peripheral devices of said predetermined type, each said communications path being provided in correspondence with said first or second peripheral interface that is coupled to each of said peripheral devices of said predetermined type;

c) second means for establishing a control path between each of said peripheral devices of said predetermined type and said operating system, each said control path being provided in correspondence with said first or second peripheral interface that is coupled to each of said peripheral devices of said predetermined type; and d) common control means for managing said communications and control paths between said operating system and each of said peripheral devices of said predetermined type, wherein said first and second peripheral interfaces include first and second types of identifying information, said first type of identifying information including a general peripheral interface identification designator and said second type of identifying information including a specific peripheral interface type designator.

2. The device driver system of claim 1 wherein said first and second peripheral interfaces are characterized as having respective first and second peripheral interconnection buses conformant to a common bus definition.

3. The device driver system of claim 1 wherein said first and second peripheral interfaces are characterized as having respective first and second peripheral interconnection buses conformant to different bus definitions.

4. A device driver for use in a computer system having one or more peripheral adapter interface buses providing for the interconnection of respective peripheral adapter units with a central processing unit, said device driver comprising:

a) a device driver core coupled to an operating system executed by said central processing unit; and b) an initialization routine including means for scanning each of said peripheral adapter interface buses to identify predetermined data including adapter identification data and adapter type data and means for registering said device driver core with said operating system to establish a logical correspondence between a single instantiation of said device driver core and each instance of a peripheral adapter unit corresponding to said predetermined data, wherein said computer system includes a plurality of peripheral adapter interface buses, wherein each of said peripheral adapter interface buses are different, and wherein said initialization routine includes means for establishing different types of interrupt source references for predetermined ones of said peripheral adapter interface buses.

5. An article of manufacture comprising a computer usable medium having computer readable program code means embodied therein to control access to multiple peripheral devices in a computer system having a central processor for executing an operating system, a memory, and first and second peripheral interfaces providing for the interconnection of first and second peripheral devices with said central processor, said first and second peripheral interfaces corresponding to first and second predetermined different classes of peripheral devices, the computer readable program code means in said article of manufacture comprising:

a) means, provided as computer readable program code, for scanning said first and second peripheral interfaces to identify peripheral devices of a predetermined type;

b) first means, provided as computer readable program code, for establishing a communications path between said operating system and each of said peripheral devices of said predetermined type, each said communications path being provided in correspondence with said first or second peripheral interface that is coupled to each of said peripheral devices of said predetermined type;

c) second means, provided as computer readable program code, for establishing a control path between each of said peripheral devices of said predetermined type and said operating system, each said control path being provided in correspondence with said first or second peripheral interface that is coupled to each of said peripheral devices of said predetermined type; and d) common control means, provided as computer readable program code, for managing said communications and control paths between said operating system and each of said peripheral devices of said predetermined type, wherein said first and second peripheral interfaces include first and second types of identifying information, said first type of identifying information including a general peripheral interface identification designator and said second type of identifying information including a specific peripheral interface type designator.

6. The article of manufacture of claim 5 wherein said first and second peripheral interfaces are characterized as having respective first and second peripheral interconnection buses conformant to a common bus definition.

7. The device driver system of claim 5 wherein said first and second peripheral interfaces are characterized as having respective first and second peripheral interconnection buses conformant to different bus definitions.

* * * * *